United States Patent [19]

Adamson et al.

[11] Patent Number: 4,936,748
[45] Date of Patent: Jun. 26, 1990

[54] AUXILIARY POWER SOURCE IN AN UNDUCTED FAN GAS TURBINE ENGINE

[75] Inventors: Arthur P. Adamson; Lawrence Butler, both of Cincinnati, Ohio

[73] Assignee: General Electric Company, Cincinnati, Ohio

[21] Appl. No.: 276,988

[22] Filed: Nov. 28, 1988

[51] Int. Cl.$^5$ .............................................. B64C 11/48
[52] U.S. Cl. .................................... 416/123; 416/129; 416/170 R; 416/171; 60/226.1
[58] Field of Search ................... 416/123, 171, 170 B, 416/129; 60/39.162, 226.1, 268

[56] References Cited

U.S. PATENT DOCUMENTS

| | | | |
|---|---|---|---|
| 2,409,446 | 10/1946 | Davlecka et al. | 416/129 R X |
| 2,505,660 | 4/1950 | Baumann | 416/171 X |
| 3,358,440 | 12/1967 | Freid | 416/171 X |
| 3,448,946 | 6/1969 | Nagatsu | 416/123 |
| 3,483,696 | 12/1969 | Gilbert et al. | 416/170 B X |
| 3,678,690 | 7/1972 | Shohet et al. | 415/61 X |
| 3,870,251 | 3/1975 | Breuner | 416/123 X |
| 4,062,185 | 12/1977 | Snow | 60/204 |
| 4,159,624 | 7/1979 | Gruner | 416/129 R X |
| 4,222,233 | 9/1980 | Johnson et al. | 60/225 |
| 4,817,382 | 4/1989 | Rudolph et al. | 416/129 X |

FOREIGN PATENT DOCUMENTS

| | | | |
|---|---|---|---|
| 259296 | 6/1949 | Switzerland | 416/171 |
| 586557 | 3/1947 | United Kingdom | 416/171 |
| 1152741 | 5/1969 | United Kingdom | 416/170 B |
| 2129502 | 5/1984 | United Kingdom | 416/171 |

Primary Examiner—Everette A. Powell, Jr.
Attorney, Agent, or Firm—Jerome C. Squillaro; Nathan D. Herkamp

[57] ABSTRACT

A power takeoff for an unducted fan gas turbine engine having first and second counterrotating coaxial rotors coupled respectively to first and second propellers. The rotors and propellers are oriented for rotation about a longitudinal axis of the engine. A gear is coupled to each of the rotors for rotation therewith and arranged to provide rotational motion about an axis transverse to the engine axis. A shaft is coupled to the gear for rotation about the transverse axis. Each of the propellers includes a plurality of propeller blades, each of the blades is rotatable about a corresponding blade axis, and a control is coupled to the blades for varying the pitch thereof whereby power is selectively distributed between the propellers and the power takeoff. The power takeoff may include a propeller coupled to the shaft for developing thrust substantially transverse to the engine axis and/or a pump, compressor, or generator to supply fluids or electric power to other apparatus.

10 Claims, 4 Drawing Sheets

AUXILIARY POWER SOURCE IN AN UNDUCTED FAN GAS TURBINE ENGINE

FIELD OF THE INVENTION

The present invention relates to gas turbine aircraft engines in which energy from the power turbine section of the engine can be alternately extracted to either provide thrust along the rotating turbine axis or to provide power to a shaft transverse to the turbine axis for applications such as vertical lifting or provision of large amounts of auxiliary power.

BACKGROUND OF THE INVENTION

In the past, several types of gas turbine engines have been available for powering aircraft. The turbofan and the turboprop are two examples of such engines. The turbofan engine includes a core engine, i.e., a gas generator, for generating combustion gases which are expanded through a power turbine to drive a fan, whereas the turboprop engine includes a gas generator and power turbine which drives a propeller. Conventional turboprop engines differ from turbofan engines in several fundamental respects. For example, turboprop engines typically have a much greater blade diameter than turbofan engines. This allows the blades to move a relatively large mass of air for producing thrust. Furthermore, for a given energy input to the blades, a relatively small velocity increase will be imparted to the air passing therethrough. Small velocity increases translate to high engine propulsive efficiencies. Simply stated, propulsive efficiency is a measure of how much available energy is converted to propulsive force. Large velocity increases to air passing through propulsor blades result in "wasted" kinetic energy and lower propulsive efficiency.

Turbofan engines move a somewhat smaller mass of air than do turboprops for the same energy input and impart a larger velocity component to the air in order to achieve the required thrust. This results in a lower propulsive efficiency. Turbofan engines also include a nacelle radially surrounding the fans. This creates an additional drag on the engine which degrades overall engine efficiency. However, the nacelle defines an inlet which diffuses the airstream entering the fan thereby slowing its speed. In this manner, air enters the fan with relatively low axial velocity which is generally independent of flight speed. Such low axial velocities decrease blade drag losses thereby making higher cruise speeds attainable.

Intermediate-sized transport aircraft, for example, 100 to 180 passenger transports, typically utilize turbofan engines for propulsion. Turbofans provide the relatively high thrust required for powering these aircraft at relatively high altitudes and at cruise speeds of about Mach 0.6 to about Mach 0.8. For aircraft designed for lower cruise speeds, conventional turboprops are typically used inasmuch as they can provide superior performance and efficiency. For example, significant reductions in fuel burn, i.e., the amount of fuel consumed per passenger mile, are possible from the use of the aerodynamically more efficient turboprop over the turbofan.

Frequently, it is desirable to have a gas turbine engine which is capable not only of providing a propulsive thrust but also a vertical lifting thrust or auxiliary mechanical power for operating a generator and other equipment in an aircraft. By "vertical lifting thrust" it is meant that a vertical force is exerted on the aircraft to oppose gravity while a "propulsive force" is understood to mean a force which propels an aircraft in a substantially horizontal direction. In one prior art system, vertical lifting thrust is provided by a gas turbine engine having rotatable fan blades pivotally mounted to an aircraft. The fan blades produce a force parallel to the longitudinal axis of the engine. To produce a lifting force the engine is pivoted with respect to the aircraft such that the longitudinal axis is substantially perpendicular to the ground. As the engine is pivoted parallel to the ground, the propulsive force to the aircraft increases and the lifting force decreases. Aircraft incorporating such systems are frequently called vertical take-off and landing (VTOL) aircraft.

Alternate means for providing a vertical lifting thrust are known in the art, such as, for example, the provision of propellers or fans which rotate about a vertical axis as are found in helicopters. Shaft turbine engines, which have been used for such vertical lifting, are like turboprop engines. In VTOL aircraft, vertical thrust has been effected in part by lift fans which are driven by exhaust from turbojet propulsion engines which impinges on the fan blading.

In order to provide a vertical lifting thrust in an intermediate-sized transport aircraft a relatively large power output is required. For this purpose it is desirable to have a comparatively more efficient gas turbine engine having significant performance increases over conventional turbofan or turboprop engines. Preferably, such an engine would be directly coupled to propulsive blading as well as vertical lift blading in order to control the balance of propulsive and lifting forces.

In some aircraft applications of gas turbine engines, it is desirable to provide some means of driving special auxiliary equipment directly from the engine, i.e., to provide a high capacity power takeoff from the engine. Such power takeoff may be used to drive generators or alternators to provide electrical power to equipment aboard the aircraft. The ability to provide auxiliary power must be balanced against the need for propulsive thrust from the engine, i.e., the extracted auxiliary power should not detrimentally affect the available thrust from the engine. However, it is also desirable to maximize the available auxiliary power at times when the engine thrust is at minimum or cruise values without significant effect on engine performance. A power takeoff suitable for providing sufficient power could be used to provide a vertical lifting force or could drive a large electric generator to provide a large amount of electric power. It will be recognized that prior art systems of the type described above which use primary thrust mechanisms for generating vertical lifting thrust do not provide for large quantities of auxiliary power. Typically, prior engines extract small amounts of auxiliary power from the gas generator rotor via gears, but this method cannot provide the large amount of power contemplated in this invention due to the overwhelming disturbance to the gas generator operation.

A recent improvement over the engines described above is the unducted fan engine, such as disclosed in U.S. patent application Ser. No. 071,594 - Johnson, filed July 10, 1987. In the unducted fan engine, the power turbine includes counterrotating rotors and turbine blades which drive counterrotating unducted fan blades radially located with respect to the power turbine. In order to achieve optimum performance, each of the unducted fan blades has a variable pitch.

In view of the above-mentioned limitations believed to exist among conventional turboprop and turbofan engines, it is an object of the present invention to provide a single gas turbine engine which more efficiently transfers combustion energy into propulsion as well as vertical lift or auxiliary power than engines known in the prior art. Another object of the present invention is to provide a means for efficiently controlling the distribution of combustion energy into propulsive and auxiliary power. Still another object of the present invention is to provide a means for adjusting the speed of vertical lifting blades in order to impart a relatively large quantity of air and improve the efficiency of lifting. The present invention comprises a relatively simple, reliable and efficient system for providing an aircraft with horizontal propulsive thrust as well as vertical lifting thrust or large amounts of auxiliary power in order to meet aircraft and equipment requirements.

In an illustrative embodiment, the present invention comprises a new and improved gas turbine engine having a gas generator effective for generating combustion gases and means for efficiently transferring the combustion energy into a net engine thrust. The transferring means include a counterrotating power turbine with first and second counterrotating propellers. The power turbine includes a first rotor having a plurality of first turbine blade rows extending radially outwardly therefrom and a second rotor having a plurality of second turbine blade rows extending radially inwardly therefrom. The first and second rotors are arranged so as to define inner and outer flowpath surfaces, respectively, for the combustion gases flowing through the power turbine. The power turbine is effective for receiving the combustion gases and extracting substantially all the output power therefrom for driving the first and second rotors in counterrotating directions. The first and second counterrotating propellers each have a plurality of variable pitch blades attached to first and second rotatable nacelle rings, respectively. The first and second propellers are directly coupled to and driven by the first and second rotors, respectively, and are disposed radially outwardly of the power turbine. Each of the blades has a relatively high hub radius to tip radius ratio and relatively low thickness to chord ratio. The propeller blades are capable of producing a propulsive force in a direction parallel to the longitudinal axis of the engine. A first beveled gear, having an axis of rotation parallel to the engine centerline, is coupled to and driven by the first rotor. A second beveled gear, having an axis of rotation parallel to the engine centerline, is coupled to and driven by the second rotor. A third beveled gear is coupled to and driven by the first and second beveled gears. The third gear is coupled to an auxiliary drive shaft oriented substantially perpendicular to the primary engine axis. The drive shaft may be coupled to mechanically drive an alternator or generator or to drive a plurality of variable pitch lifting fan blades such that rotation of the third gear rotates the lifting fan blades. Rotation of the rotors drives the lifting fan blades as well as the propeller blades. Energy from the rotors may be transferred to the propeller blades and the lifting blades in variable proportions by varying the corresponding pitch of the propeller blades and the lifting blades. Alternately, modulated energy can be transferred to a large generator or fluid pump by adjusting the pitch of the forward propulsive blades. This transferred energy can even exceed the total outpower of the gas generator system by adding to the turbine power the transient power available by setting the propulsive blade pitch to the windmill condition.

BRIEF DESCRIPTION OF THE DRAWINGS

The present invention is illustrated by way of example in the Figures of the accompanying drawings in which.

DESCRIPTION OF THE PREFERRED EMBODIMENT

Figure 1:
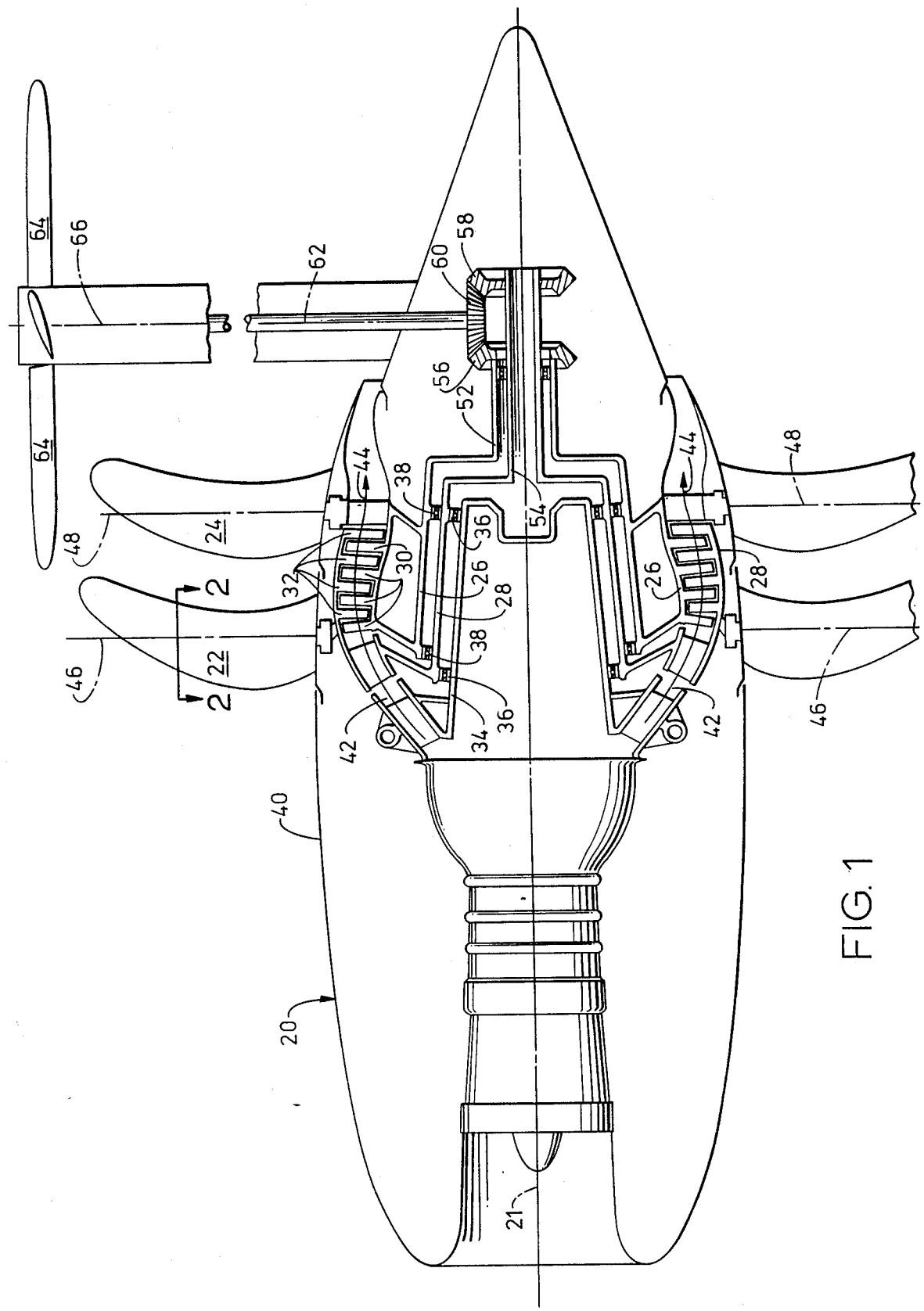
FIG. 1 illustrates, in one embodiment of the invention, a side elevational view in section of an unducted fan-type gas turbine engine including a plurality of lifting fan blades.

FIG. 1 illustrates an unducted fan gas turbine aircraft engine 20 having a longitudinal axis 21 along the engine centerline. The engine includes forward and aft counterrotating propeller blades 22 and 24 disposed radially outwardly of a power turbine 25. The power turbine 25 includes first and second counterrotating rotors 26 and 28 and a plurality of stages of counterrotating turbine blades 30 and 32 coupled to the first and second counterrotating rotors 26 and 28, respectively. Forward and aft propeller blades 22 and 24 are coupled to and rotate with the first and second rotors 26 and 28, respectively. The first rotor 26 is coaxially disposed about a static structure 34. First bearing 36 supports the first rotor 26 about the static structure 34. The second rotor 28 is coaxial with the first rotor 26. Second bearing 38 supports the second rotor 28 about the first rotor 26 for rotation. An outer shroud or nacelle 40 encompasses the rotors 26 and 28 with the fan blades 22 and 24 disposed radially outwardly of the nacelle 40. The purpose of the nacelle 40 is to provide the proper airflow characteristics to optimize the performance of the fan blades 22 and 24.

The engine 20 further includes an annular gas flowpath 42 passing the blades 30 and 32. Air entering the engine 20 is compressed and undergoes combustion to form a high energy (high pressure/high temperature) gas stream, denoted generally by arrow 44. The high energy gas stream 44 is expanded through the plurality of turbine blades 30 and 32 in order to turn the counterrotating rotors 26 and 28 which drive the propeller blades 22 and 24, respectively.

Figure 2:
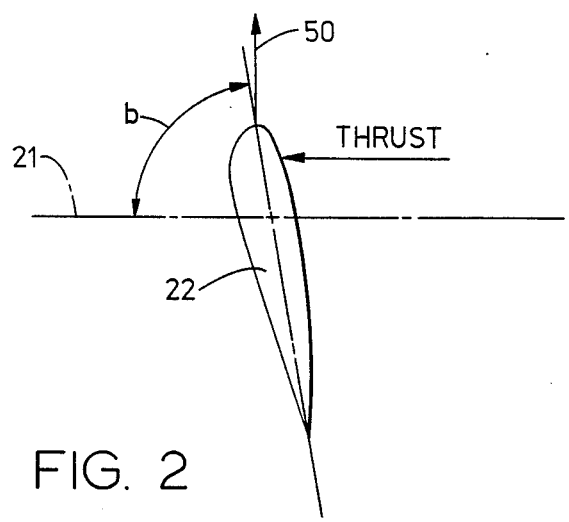
FIG. 2 is a radial end view of a propeller blade.

To further optimize the performance of the unducted fan engine 20, it is desirable to vary the pitch of the propeller blades 22 and 24. Each of the forward propeller blades 22 has a pitch change axis 46 and each of the aft propeller blades has a pitch change axis 48 about which the blade pitch may be adjusted in order to vary the amount of combustion energy used for thrust along axis 21. Referring to FIG. 2, illustrating blade 22 from a radial end view, the blade pitch is defined by the angle b which the blade 22 makes with respect to the engine centerline 21. Arrow 50 represents the direction of travel of the blades 22. When angle b is 90°, blade 22 is parallel to the direction of rotation, i.e., b is a fine pitch angle, and no thrust is produced by the blade 22. Since very little thrust is produced at a fine pitch angle, relatively little energy is required to rotate the blades at fine pitch. As the angle b is decreased, the blades 22 direct an increasing mass of air in the aft direction along axis 21 and a thrust in proportion to the mass of air is produced. The greater the thrust, the greater the energy required to rotate the blade 22 about the axis 21. Thus, the amount of thrust produced by blade 22 is proportional to the amount of energy extracted from the gas stream 44 by the blade 22.

It may be desirable to extract energy from the gas stream 44 to power an alternate system such as a generator or an additional set of fan blades. By using a system of beveled gears, energy from the gas stream 44 not used to rotate the propeller blades 22 and 24 can be used to power the alternate system. It may even be desired in some cases to extract energy for a short time from the airstream by placing the propulsive blades in the windmill mode and thus supplying the combined power from the airstream and the gas stream 44 to drive an external load such as a generator.

In an illustrative embodiment of the invention, the first rotor 26 is rigidly coupled to one end of a first longitudinal shaft 52 rotatably disposed about the axis 21. A second longitudinal shaft 54 is similarly coupled at one end to the second rotor 28 and rotates therewith. The second shaft 54 is concentrically disposed within the first shaft 52. Rotation of each rotor 26 and 28 results in rotation of shafts 52 and 54, respectively. A second end of shaft 52 is connected to beveled gear 56 and a second end of shaft 54 is coupled to beveled gear 58. A third beveled gear 60 mates with the first and second beveled gears 56 and 58 in order to translate rotational energy about axis 21 to axis 66 which is transverse to axis 21. Rotation of gears 56 and 58 drive the third beveled gear 60. A third shaft 62, rotatable about axis 66, is rigidly secured to gear 60. Thus, the counter-rotating rotors turn shaft 62. As shown in FIG. 1, a plurality of lifting fan blades 64 may be coupled to rotatable shaft 62 in order to provide vertical lifting thrust. The amount of combustion energy available to shaft 62 is dependent upon the pitch angle of the propeller blades 22 and 24 as well as the fan blades 64. When maximum propulsion is being produced by the propeller blades minimum energy is available to the lifting blades. On the other hand, when the propeller blades 22 and 24 have fine pitch angles, they produce minimal propulsion and a relatively large amount of energy is available for lifting thrust. The shaft 62 may be coupled to fan blades 64 by a gearbox of a type well known in the art.

In an aircraft incorporating the illustrative embodiment of the invention, when a vertical lifting thrust is desired, most of the combustion energy is transferred to the lifting fan blades 64 by appropriate selection of a fine pitch angle for blades 22 and 24 and a large pitch angle for blades 64. Maximum horizontal propulsion can be produced by increasing the pitch of the propeller blades and changing the pitch of the lifting blades 64 to a fine angle.

Figure 5:
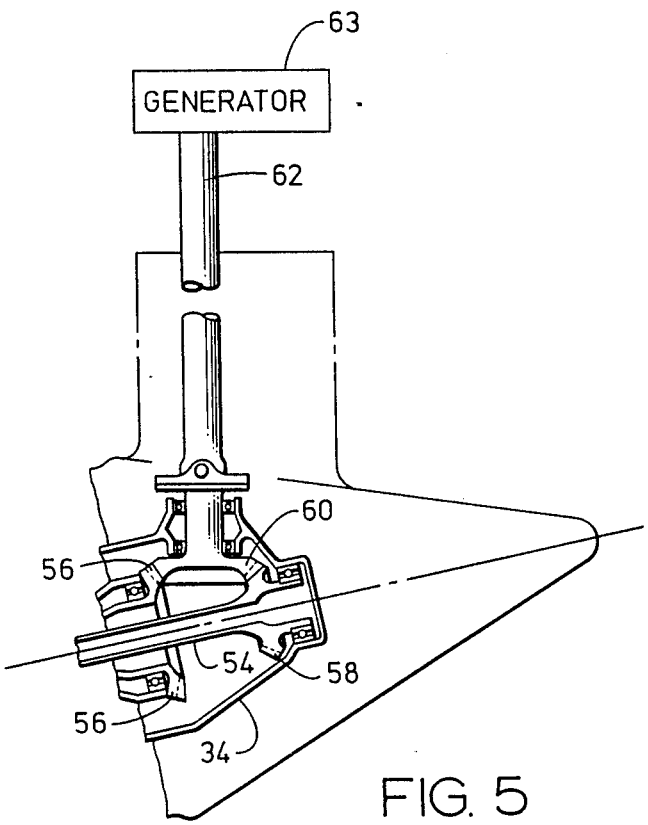
FIG. 5 is a partial cross-sectional view of an unducted fan gas turbine engine connected for mechanically driving an electrical generator.

As shown in FIG. 5, power supplied to the shaft 62 could be used to drive a generator 63 or the like rather than to drive the illustrative lifting fan blades 64. During flight, the engine could be used to operate the generator even though the engine itself is not operating. For example, if the engine were turned off by the pilot during high speed flight with the propeller blade pitch adjusted so that wind blowing over the propeller blades 22 and 24 rotates the rotors 26 and 28, the propellers would act like windmills coupled to the generator 63 in order to produce electric energy. It is contemplated that the windmill effect would be utilized during an aircraft descent or in an extraordinary situation such as a loss of power to one of several engines or even as a normal short time mode to supply very large short time power demands. In this large power mode, the total power turbine power plus the total windmill power could be available to the generator or pump.

Figure 4:
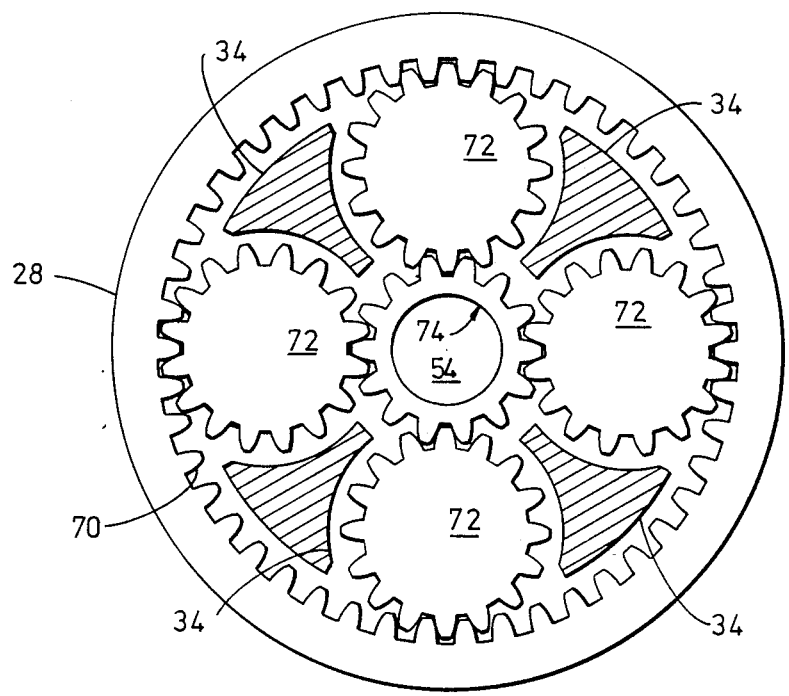
FIG. 4 illustrates a system of gears incorporated in an alternate embodiment of the invention.
Figure 3:
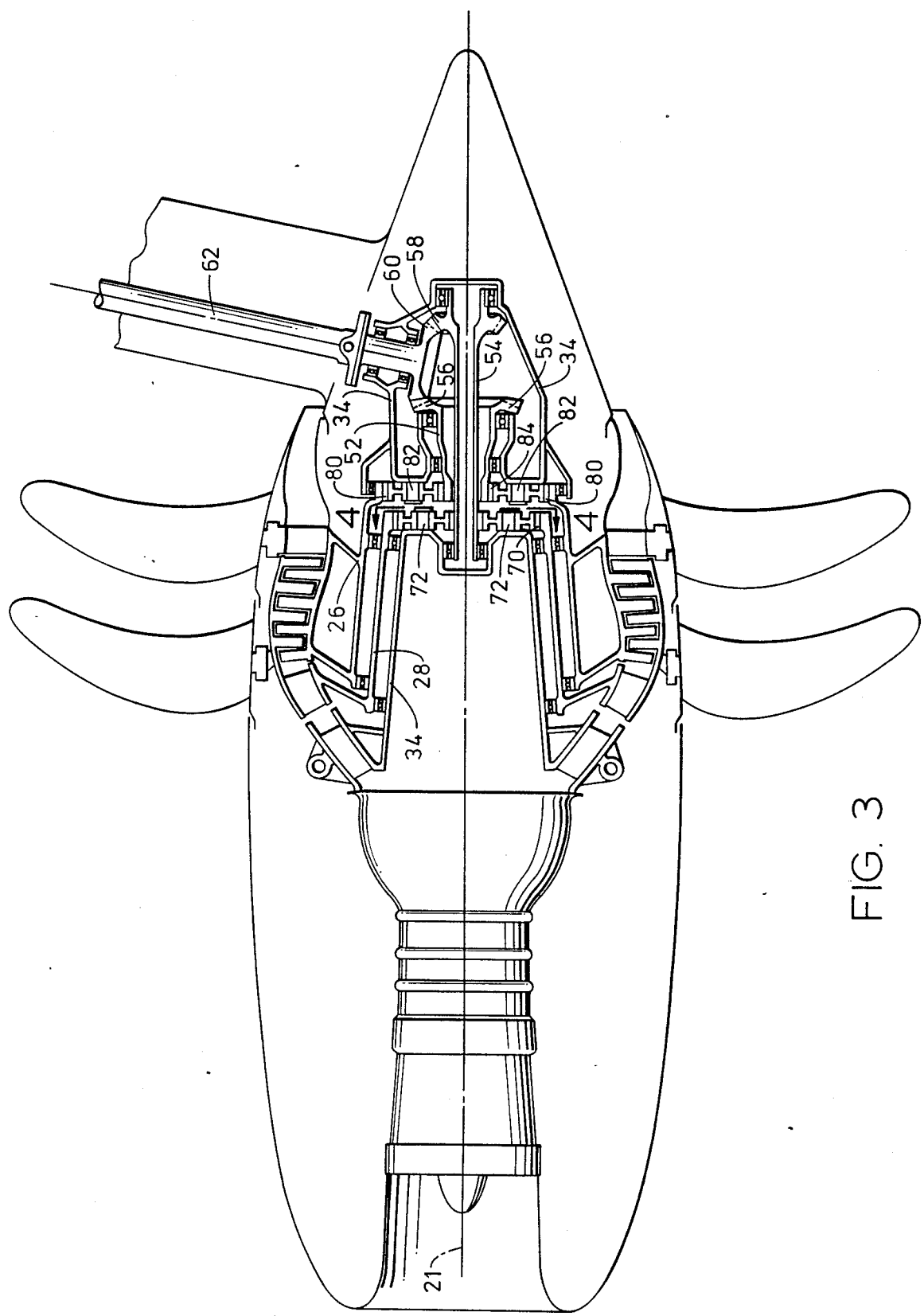
FIG. 3 illustrates a side elevational view, in section, of an unducted fan-type gas turbine engine including a planetary gear system for driving a plurality of lifting blades.

Reference is now made to FIGS. 3 and 4 which illustrate another embodiment of the present invention wherein planetary gear trains are used to step up the speed of shaft 62. A first internal gear 70, i.e., a gear having gear teeth on an internal surface of an annulus, is rigidly coupled to rotor 28. A plurality of spur gears 72 are rotatably connected to the stator 34 and each has an axis of rotation parallel to axis 21. The spur gears mate with and are driven by internal gear 70. A driven gear 74 is concentrically disposed within the internal gear 70. The driven gear 74 mates with each of the spur gears 72 and is coupled to shaft 54 by means of beveled gear 58. Thus, rotation of internal gear 70 causes rotation of the beveled gear 58 about axis 21. A second internal gear 80 is rigidly secured to rotor 26. Internal gear 80 rotates about axis 21 with rotor 26. A second plurality of spur gears 82 are rotatably coupled to the stator 34 and each has an axis of rotation parallel to axis 21. The spur gears 82 mate with and are driven by internal gear 80. A second driven gear 84 is concentrically disposed within the internal gear 80. Driven gear 84 mates with each of the spur gears 82 and is rigidly secured to the shaft 52 which in turn is coupled to beveled gear 56. Rotation of the rotor 26 causes beveled gear 56 to rotate about axis 21. As with the embodiment of FIG. 1, beveled gears 56 and 58 mate with and drive the beveled gear 60. With the use of the above-described planetary gear trains, the speed of shaft 62 may be stepped up or down relative to the speed of the rotors 26 and 28.

While the principles of the invention have now been made clear in an illustrative embodiment, it will become apparent to those skilled in the art that many modifications of the structures, arrangements and components presented in the above illustrations may be made in the practice of the invention in order to develop alternative embodiments suitable to specific operating requirements without departing from the scope and principles of the inventions as set forth in the claims which follow.

We claim:

1. In an unducted fan gas turbine engine including first and second coaxially disposed rotors oriented for rotation about a longitudinal engine axis, a plurality of first propeller blades coupled to the first rotor and a plurality of second propeller blades coupled to the second rotor, the propeller blades providing thrust along the longitudinal axis, apparatus for converting power from the rotors into thrust transverse to the longitudinal axis of the engine comprising:

gear means coupled to the first and second rotors for providing power transverse to the longitudinal axis; and thrust means coupled to a said gear means for converting the transverse power into a thrust transverse to the longitudinal axis.

2. The apparatus of claim 1 wherein said thrust means comprises:

at least one rotatable shaft coupled to said gear means; and at least a first propeller coupled to said first rotatable shaft for rotation in a plane substantially parallel to the engine longitudinal axis.

3. The apparatus of claim 2 wherein said first propeller comprises a plurality of rotatable propeller blades and including means for regulating the thrust transverse to the engine longitudinal axis.

4. The apparatus of claim 3 wherein said regulating means comprises means for varying the pitch of said propeller blades.

5. The apparatus of claim 1 wherein said gear means comprises means for providing at least one preselected gear ratio between said thrust means and the first and second rotors.

6. A power takeoff for an unducted fan gas turbine engine having first and second counterrotating coaxial rotors coupled respectively to first and second propellers, the rotors and propellers being oriented for rotation about a longitudinal axis of the engine, said power takeoff comprising:

gear means coupled to each of the rotors for rotation therewith, said gear means being arranged to provide rotational motion about an axis transverse to the engine axis; and shaft means coupled to said gear means for rotation about said transverse axis.

7. The power takeoff of claim 6 wherein said gear means comprises at least one bevel gear, each of said first and second rotors including at least one fixedly attached gear arranged to engage said bevel gear whereby each of said rotors provides substantially the same power to said bevel gear.

8. The power takeoff of claim 6 wherein each of said propellers includes a plurality of propeller blades, each of said blades being rotatable about a corresponding blade axis, and control means coupled to said blades for varying the pitch thereof whereby power is selectively distributed between said propellers and said power takeoff.

9. The power takeoff of claim 8 wherein the pitch of said propeller blades is selectable to effect rotation of said shaft means in response to airflow over said propeller blades.

10. The power takeoff of claim 8 and including at least one propeller coupled to said shaft means for developing thrust substantially transverse to said engine axis.

* * * * *